United States Patent [19]

Henry et al.

[11] Patent Number: 5,343,260
[45] Date of Patent: Aug. 30, 1994

[54] COMPOSITE OPHTHALMIC LENSES AND THEIR MANUFACTURE

[75] Inventors: David Henry, Saint Michel Sur Orge; Andre J. Vachet, La Genevraye; Jacques J. Vial, Noisy Sur Ecole, all of France

[73] Assignee: Corning Incorporated, Corning, N.Y.

[21] Appl. No.: 907,110

[22] Filed: Jul. 1, 1992

[30] Foreign Application Priority Data

Feb. 17, 1992 [FR] France .................. 92 01745

[51] Int. Cl.$^5$ .................................................. G02C 7/02
[52] U.S. Cl. ..................................... 351/159; 351/163; 351/166; 351/177
[58] Field of Search ................. 351/159, 163, 166, 177

[56] References Cited

U.S. PATENT DOCUMENTS

| | | | |
|---|---|---|---|
| 3,391,053 | 7/1968 | Kolb | 428/419 |
| 3,940,304 | 2/1976 | Schuler | 156/245 |
| 3,970,362 | 7/1976 | Laliberte | 350/155 |
| 4,268,134 | 5/1981 | Gulati et al. | 351/163 |
| 4,495,015 | 1/1985 | Petcen | |
| 4,679,918 | 7/1987 | Ace | 351/163 |
| 4,793,703 | 12/1988 | Fretz | 351/163 |
| 4,838,673 | 6/1989 | Richards et al. | 351/44 |
| 4,865,670 | 9/1989 | Marks | 156/99 |
| 4,915,495 | 4/1990 | Takeuchi | 351/49 |
| 4,923,758 | 5/1990 | Marks et al. | 428/436 |

FOREIGN PATENT DOCUMENTS

| | | |
|---|---|---|
| 0388719 | 8/1990 | European Pat. Off. . |
| 0477658 | 11/1991 | European Pat. Off. . |
| 1339150 | 9/1971 | United Kingdom . |

OTHER PUBLICATIONS

Bausch & Lomb, *Ophthalmic Lenses Their History Theory–And Application*, p. 21 (1935).

*Primary Examiner*—Scott J. Sugarman
*Attorney, Agent, or Firm*—C. S. Janes, Jr.

[57] ABSTRACT

This invention is directed to the fabrication of composite lenses consisting of a transparent thermoset polymer exhibiting an index of refraction of at least 1.58 and a thin glass element of essentially constant thickness adhered to the front surface of the polymer without the use of an adhesive, the glass element having a thickness not exceeding 0.3 mm and the thermoset polymer being an aromatic epoxy resin.

16 Claims, 1 Drawing Sheet

COMPOSITE OPHTHALMIC LENSES AND THEIR MANUFACTURE

RELATED APPLICATION

U.S. patent application Ser. No. 07/907,116, filed concurrently herewith by E. Firtion et al. under the title COMPOSITE OPHTHALMIC LENSES and assigned to the assignee of the present application, discloses the preparation of glass-plastic composite lenses comprising a thin glass element bonded to a relatively thick transparent lens or lens preform made of poly(-diethylene glycol)bis(allyl carbonate) by a transparent adhesive layer of optical quality having an elastic modulus in the range of 0.13–1.0 MPa at 100% elongation and an elongation at rupture of at least 200%.

BACKGROUND OF THE INVENTION

The invention relates to new composite glass/plastic material ophthalmic lenses with a high index of refraction and their manufacturing.

Composite lenses are desirable products to the extent that the part made of plastic material contributes lightness of weight and shock resistance while the glass part provides resistance to radiation, ability to receive a wide range of lasting surface treatments (anti-reflecting, reflecting, coloration) and, if necessary, lasting photochromism.

Through European Patent Application No. 182,503 [which corresponds to U.S. Patent No. 4,679,918 (Ace)] for example, composite lenses are known which consist of a lens made of plastic material stuck to a glass element of constant thickness by means of a relatively thick elastomer adhesive layer. The disadvantage of such lenses is their relatively heavy weight and especially their excessive thickness, particularly at the edge in the case of negative power lenses, which makes them aesthetically not very attractive.

Attempts have also been made to produce composite lenses by casting a liquid thermosetting plastic material onto a thin glass element, followed by heating with the intention of hardening the plastic material. This process has not been successful because of the great stresses exerted on the glass element by the plastic part during cooling because of the extensive contraction of the plastic material, stresses which cause the glass element to break or which bring about other redhibitory defects, as is explained in the preamble of French Patent No. 2,407,898 [which corresponds to U.S. Patent No. 4,227,950 (Spycher)].

As a solution to the problems encountered in prior techniques, French Patent No. 2,407,898 proposes a process of direct pouring for the production of a composite article which consists of a glass element connected to a thermosetting plastic material which exhibits a high degree of contraction, the composite article demonstrating low residual stresses between the glass element and the plastic element, which comprises the operations consisting of covering selected portions of the surface of the glass element with a thermoplastic adhesive with a hot gluing temperature higher than the minimum hardening temperature of the thermosetting plastic material; of pouring the thermosetting plastic material in liquid form over the portions of the surface of the glass element which were covered with the thermoplastic adhesive; of curing the thermosetting plastic material by heating the plastic material, the glass element, and the thermoplastic adhesive to a temperature lower than the hot gluing temperature of the thermoplastic adhesive, but higher than the minimum temperature of hardening of the thermosetting material; and of solidly connecting the cured thermosetting plastic material, the thermoplastic adhesive, and the glass element into a single glass-plastic material composite article by heating these components to a temperature higher than the hot gluing temperature of the thermoplastic adhesive.

Composite lenses produced by this process have, however, not been developed industrially because of their complicated manufacturing process.

There is, therefore, an unsatisfied need for composite lenses which are lightweight, not very thick, and which are easy and economical to manufacture.

SUMMARY OF THE INVENTION

The invention aims to provide new composite lenses produced by direct pouring which are light and not very thick.

The invention also aims to provide new composite lenses produced by direct pouring, which have a high index of refraction, that is to say, at least 1.58.

More particularly, the invention relates to a composite lens consisting of a lens made of a transparent thermoset polymer with an index of refraction of at least 1.58 and a thin glass element of essentially constant thickness which sticks to the anterior surface of a thermoset aromatic epoxy resin; and the thermoset polymer is a thermoset aromatic epoxy resin; and the thin glass element has an essentially constant thickness of at most 0.3 mm.

The invention also relates to a process for manufacturing such a lens, characterized by the fact that it consists of pouring a thermosetting aromatic epoxy resin composition, which after curing forms a transparent aromatic epoxy resin with an index of refraction of at least 1.58, directly into the concave part of a thin preformed glass element with an essentially constant thickness of at least 0.15 mm and at most 0.3 mm; of applying onto the mass of poured thermosetting composition a counterform to shape the upper surface of said mass as desired; of subjecting the element-mass-counterform assembly to a thermal treatment which brings about the hardening of the thermosetting composition; of removing the counterform; and then of proceeding with trimming the edges of the lens.

According to a particular embodiment, the thin glass element is a photochromic glass element.

The invention results from the surprising discovery that, by combining the use of an aromatic epoxy resin with the use of an ultrathin glass element of essentially constant thickness, one can obtain composite lenses which are lightweight (and therefore comfortable to wear), and which are not very thick (and therefore aesthetically satisfactory).

The choice of an epoxy resin was not obvious, because the epoxy resins are not currently used for commercially manufacturing ophthalmic lenses. Moreover, French Patent No. 2,407,898 clearly indicates in the preamble that the use of epoxy resin for the production of composite lenses by direct pouring had not allowed the obtaining of satisfactory results.

The aromatic epoxy resins suitable for forming composite lenses of the invention are produced by curing thermosetting compositions which contain an aromatic diepoxide and a hardener chosen from the anhydrides of aromatic diacids and the aromatic diamines.

It should be noted that the term "aromatic" as it is used in the present description, describes monomers and resins which are not necessarily entirely aromatic, but which can include, beside aromatic fragments, aliphatic and/or non-aromatic cyclic fragments.

As examples of the aromatic diepoxides available in commerce, one can mention diglycidyl ether bisphenol A (abbreviated DGEBA) with the formula:

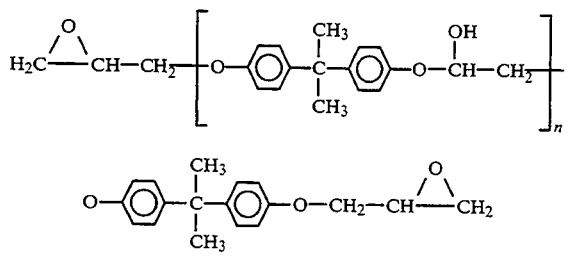

in which n=0 to 0.4, on the average, which is the preferred compound, and resorcinol diglycidyl ether (RDGE) with the formula:

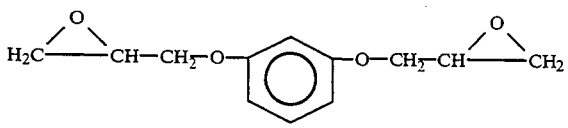

As an example of an easily available aromatic diacid anhydride, one can mention phthalic anhydride.

As examples of aromatic diamines available in commerce, one can mention 4,4'-diaminodiphenylsulfone, 4,4'-diaminodiphenylmethane, m-phenylenediamine, xylylenediamine. 4,4'-diaminodiphenylsulfone and xylylenediamine are preferred.

The thermosetting composition is obtained through careful mixing of the diepoxide with the hardener and possibly with a catalyst.

PRIOR ART

Besides U.S. Pat. No. 4,227,950 and U.S. Pat. No. 4,679,918 briefly reviewed above, attention is also called to U.S. Patent No. 4,793,703 (Fretz, Jr.), U.S. Patent No. 5,064,712 (Fretz, Jr.), U.S. Pat. No. 5,116,684 (Fretz, Jr. et al), U.S. patent application Ser. No. 07/682,479, filed Apr. 8, 1991, by D. Dasher et al. under the title HIGH INDEX ORGANIC LENS MEMBER, U.S. patent application Ser. No. 07/822,863, filed Jan. 21, 1992 by D. Dasher et al. under the title OPHTHALMIC LENS METHOD, and U.S. patent application Ser. No. 07/624,055, filed Dec. 7, 1990 by R. S. Herndon et al. under the title COMPOSITE ARTICLE AND METHOD now U.S. Pat. No. 5,139,806. Each of the latter six disclosures is concerned with composite lens structures, but none describes the present inventive method of forming such structures without the use of an intermediate adhesive.

DESCRIPTION OF PREFERRED EMBODIMENTS

Figure 1:
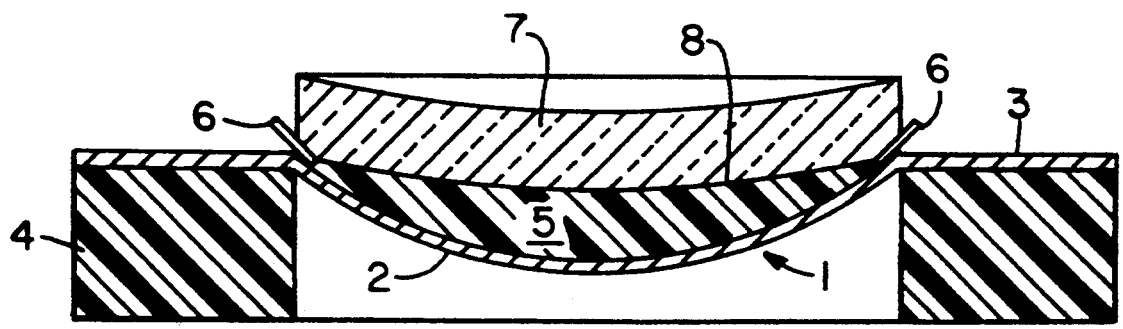
FIG. 1 is a diagrammatic view illustrating the manufacturing of a lens with a positive power.
Figure 2:
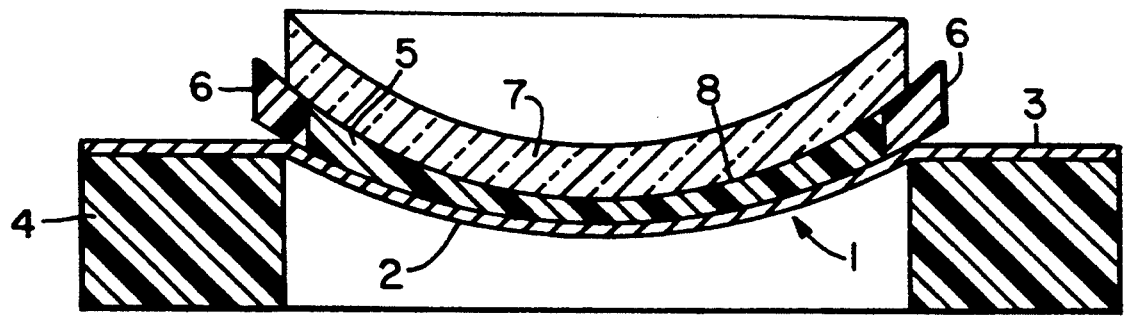
FIG. 2 is a diagrammatic view illustrating the manufacturing of a lens with a negative power.

As illustrated, ultrathin circular glass element 1, containing preformed central part 2 and an essentially flat flange 3, is placed on annular support 4, for example, made of polytetrafluoroethylene (Teflon ®), so that it rests on said support only by its flange. Before pouring, one positions, on the periphery of central part 2, wedges 6 of appropriate thickness, four for example, equidistant from each other. Then one pours an appropriate quantity of thermosetting epoxy resin 5 into the concavity of central part 2. One then applies onto the mass of thermosetting composition counterform 7, for example made of glass or polytetrafluoroethylene, whose lower surface serves to give the posterior surface of the lens the desired shape. This can be a counterform whose lower surface 8 is flat, if one wishes to produce a semi-finished lens intended to be machined later, or it can be provided with a spherical or other profile, if one wishes to produce a finished lens. FIG. 1 illustrates the case of the production of a finished lens with positive power, in which case the curvature of lower surface 8 of counterform 7 must be less than the curvature of central part 2. FIG. 2 illustrates the case of the production of a finished lens with negative power, in which case the curvature of lower surface 8 of counterform 7 must be more accentuated than that of central part 2.

The surface condition of lower surface 8 of the counterform must be as perfect as possible, and this lower surface 8 must have anti-sticking properties resulting, for example, from a treatment applied to the counterform, for example, with a Teflon ® dispersion or a silicone solution, in order to facilitate removal of the counterform after hardening of composition 5. As a variant, the counterform could be produced entirely out of a material with anti-sticking properties, for example, out of polytetrafluoroethylene.

The hardening of composition 5 can be brought about by heating the whole assembly consisting of the support 4, the glass element, the thermosetting composition, and the counterform in a furnace or oven according to a program of heating and cooling appropriate for the material used. After curing, one removes the counterform and the wedges, and one trims the edges of the composite lens to eliminate the flange and possible burrs of resin.

The aromatic epoxy resins which constitute the organic part of the composite lenses of the invention have good properties of light transmission, an index of refraction of at least 1.58 and frequently on the order of 1.6, a good natural adhesion with regard to glass, a moderate volume contraction upon hardening, a relatively low thermal expansion coefficient, a low absorption of water, a low sensitivity to U.V. radiation, a high degree of hardness, and a temperature of vitreous transition usually over 100° C., which makes them eminently useful in the application envisaged.

The glass element must have a thickness of at most 0.3 mm and preferably a thickness of 0.20 to 0.25 mm, if one wishes to avoid breaking this element during hardening of the thermosetting epoxy resin composition. Thus, this composition, although its contraction with curing is moderate, when compared with other resins used in the field of optics, in any case undergoes a certain amount of shrinkage which causes thicker elements to break, for example, 0.8 mm thick elements. At thicknesses of 0.3 mm or less, however, it was surprisingly observed that the glass element acquired sufficient flexibility to bend without breaking with the geometric deformations generated by the shrinkage of the hardening epoxy resin.

The glass element will usually consist of a sheet of ultrathin glass (called "microsheet"), of essentially constant thickness or "plano" that is to say, devoid of optical power. This glass element can be made of a colorless, colored, or photochromic mineral glass.

A "microsheet" made of photochromic glass and its production are described in U.S. Pat. No. 4,168,339 (Kerko et al.). One can also produce a photochromic glass sheet of suitable thickness ($\leq 0.3$ mm) from a thicker body by removal of material so as to reduce its thickness to the desired value by means of grinding and polishing. It is this last technique which is used to obtain the photochromic microsheet used in Example 3 below.

The microsheet, originally flat, is cut in the form of a disk whose central part is preformed to the desired shape, which can be a spherical, non-spherical, or progressive shape, for example, by a process of hot forming under the action of an under pressure, until the disk is brought in contact with a perfectly polished mold. The glass must be formed while it is very viscous ($10^9$ to $10^{11}$ Pa.s) in order to avoid glass-mold sticking. The operation is done under dust-free conditions to avoid or minimize surface defects. The resulting shaped disk then has a central part with the desired profile surrounded by an essentially flat flange which is intended to serve for support in the following operations. Other forming techniques could be used, for example, by application of centrifugal force.

All glasses and photochromic glasses of optical quality are suitable. One can use, for example, transparent glass sold under the designation 0211 by the company Corning Incorporated, Corning, New York or photochromic glass sold under the designation Photogray Extra ® by the same company.

Although the epoxy resin has a good natural adhesion to the glass element, it is advantageous and recommended, in order to obtain the best results, to pretreat the surface of the glass element which is supposed to receive the thermosetting resin composition with an adhesion promoter. Such adhesion promoters are well known in the art and are available in commerce. The most current ones are silanes, particularly epoxyalkylalkoxysilanes such as glycidoxypropyltrimethoxysilane (sold under the commercial name A187 by the company Union Carbide, Danbury, Connecticut) or aminoalkylalkoxysilanes such as gamma-aminopropyltriethoxysilane (sold under the commercial designation A1100 by the company Union Carbide).

The following non-limiting examples are given for the purpose of illustrating the invention.

In Examples 1, 2, and 4–11, circular transparent glass elements cut from a microsheet made of Corning 0211 glass and then preformed were used; whereas in Example 3 a preformed circular photochromic glass element with a thickness of 0.2–0.25 mm obtained by removal, using abrasives, of material from a semi-crude disk with the desired curvature made of Photogray Extra ® photochromic glass with a thickness of 2–2.5 mm was used.

The preformed glass elements had an overall diameter of 118 mm; the useful central part had a diameter of 70 mm. Three types of elements were prepared, of which the central parts had a radius of curvature of 69.5, 105.6, and 170 mm, respectively.

All the elements were covered, after careful cleaning, by centrifugal coating of 2900 rpm for 20 seconds, with an adhesion promoter obtained by mixing 1 wt% "A 187" silane sold by the company Union Carbide, 98 wt% ethanol, and 1 wt% distilled water, and aging of the resulting mixture for 2 hours in order to hydrolyze it. The cleaning operation consisted of brushing the glass element with an aqueous solution of a surfactant, of rinsing by brushing with distilled water, of additionally rinsing the element by immersing it in distilled water, and of drying the element by centrifugation. After the covering operation, the hydrolysate applied on the glass element was condensed by heating to 100° C. for 2 hours.

EXAMPLE 1

Preparation of Thermosetting Aromatic

Epoxy Resin Compositions

Thermosetting aromatic epoxy resin compositions A) to C) were prepared by carefully mixing the ingredients indicated at 40° C. and under vacuum, until homogeneity was obtained.

A) 3.65 parts by weight 4,4' -diaminodiphenylsulfone with an equivalent weight of amino groups of 62; and 10 parts by weight DGEBA (diglycidyl ether bisphenol A) sold under the commercial name DER 332 by the company, Dow Chemical Co., Midland, Michigan;

B) 2 parts by weight xylylenediamine; and 10 parts by weight of the DGEBA described in A).

C) 10 parts by weight of the DGEBA described in A), 7.5 parts by weight phthalic anhydride, and 0.01 parts by weight dimethylbenzylamine (catalyst) .

EXAMPLES 2–11

Manufacturing of Composite Lens

Compositions A) and C) of Example 1 were used to manufacture composite lenses by the process described above in reference to FIGS. 1 and 2. The quantities of poured composition ranged from 6.5 g for the least corrective lenses to 25 g for the most corrective lenses. Immediately after pouring, the counterform which had previously received an application of silicone RTV 141 (sold by company Rhone-Poulenc, Courberole, France) by centrifugal coating, followed by hardening by heating, in order to give it anti-sticking properties, was positioned. The poured material was then thermoset. The following table indicates the type of composite lenses produced, the conditions of curing of the epoxy resin, the properties of the hardened epoxy resin, and the results of certain tests conducted on the resulting lens. These tests were the following:

Drop Ball Test

This test, developed by the American Food and Drug Administration (FDA), consists of dropping a 16 g steel ball from a height of 1.27 m onto the convex surface of the lens. If the lens gets through the test without breaking, it successfully passes the test.

Test of Resistance to Atmospheric Agents

This test consisted of maintaining the composite lens samples in a climatic enclosure at 50QC and 98% relative humidity for 2 weeks.

Temperature Cycle Test

This test consisted of putting the composite lens samples for the indicated period of time in an enclosure in which the temperature varied from −40 to +80° C. and returned to −40° C. in the space of 2 hours.

Test of Resistance to Boiling Water

This test consisted of putting the samples in a water bath at room temperature, which was progressively brought to a boil, and of then keeping the samples for 2 hours in the boiling water.

regard to the thickness in the center (positive lenses) or the thickness at the edge (negative lenses).

It goes without saying that the embodiments described are only examples and that one could modify them, particularly by substitution of equivalent techniques, without consequently leaving the scope of the invention.

We claim:

TABLE

| | EXAMPLE NO. | | | | |
|---|---|---|---|---|---|
| | 1 | 2 | 3 | 4 | 5 |
| Poured Composition | B | B | B | B | B |
| Type of Lens | SF | SF | F, −6, 8D | F, +2D | F, +3, 5D |
| Lens Thickness (mm) | Max. 8 | Max. 10 | 1.65 at center | 3.0 at center | 4.6 at center |
| Hardening Conditions | Hold 36 hr at 105–110° C. | Hold 16 hr at TA+, Hold 5 hr at 110° | Hold 16 hr at TA+, Hold 5 hr at 110° C. | Hold 16 hr at TA+, Hold 5 hr at 110° C. | Hold 16 hr at TA+, Hold 5 hr at 110° C. |
| PROPERTIES OF EPOXY RESIN: | | | | | |
| Refractive Index | 1.623 | 1.597 | 1.597 | 1.597 | 1.597 |
| Shore Hardness D | 88 | 88 | 88 | 88 | 88 |
| Vitreous Transition Temperature °C. | 118 | 122 | 122 | 122 | 122 |
| Shrinkage With Polymerization % | 0.3–0.4 | 0.3–0.4 | 0.3–0.4 | 0.3–0.4 | 0.3–0.4 |
| RESULTS OF TESTS: | | | | | |
| Resistance to Atmospheric Agents | X | X | X | X | X (1 mo.) |
| Temperature Cycle Test | X | X | X | X | X |
| Boiling Water Test | ND | ND | X | ND | ND |
| Drop Ball Test | ND | ND | ND | ND | ND |

| | EXAMPLE NO. | | | | |
|---|---|---|---|---|---|
| | 7 | 8 | 9 | 10 | 11 |
| Poured Composition | B | B | B | C | B |
| Type of Lens | F, +5D | F, −2D | Toric, −1,7, +2, 9D cylinder 4,6 | SF | F, −6D |
| Lens Thickness (mm) | 7.5 at center | 1.6 at center | 3.7 at center | 4.8 at center | 1.6 at center |
| Hardening Conditions | Hold 16 hr at TA+, Hold 4 hr at 10° C.+, Hold 2 hr at 130° C. | Hold 16 hr at TA+, Hold 5 hr at 110° | Hold 16 hr at TA+, Hold 5 hr at 110° C. | Hold 16 hr at 96° C. + Hold 2 hr at 150° C. | Hold 16 hr at 10° C. + Hold 1 hr at 50° C. + Hold 2 hr at 100° C. |
| PROPERTIES OF EPOXY RESIN: | | | | | |
| Refractive Index | 1.597 | 1.597 | 1.597 | 1.597 | 1.597 |
| Shore Hardness D | 88 | 88 | 88 | 88 | 88 |
| Vitreous Transition Temperature °C. | 122 | 122 | 122 | 150 | 118 |
| Shrinkage With Polymerization % | 0.3–0.4 | 0.3–0.4 | 0.3–0.4 | ND | 0.3–0.4 |
| RESULTS OF TESTS: | | | | | |
| Resistance to Atmospheric Agents | X | X | X | X | X |
| Temperature Cycle Test | X | X | X | X | X |
| Boiling Water Test | X | X | X | ND | ND |
| Drop Ball Test | X | X | ND | ND | ND |

Abbreviations:
SF = semi-finished
F = finished
Max = maximum thickness in mm for a semi-finished lens
D = diopter
TA = room temperature
X = successfully passes the test
ND = not determined
hr = hours The composite lenses of the invention are finer and lighter than the composite lenses that can be obtained according to the teachings of French Patent No. 2,407,898, supra or U.S. Pat. No. 4,227,950, supra. They are in fact capable of rivaling the classical lenses made of plastic material with a high index (n =1.6) with regard to weight, and the classical glass lenses with high index (meeting the European standards in force) with 1. A composite lens consisting of a transparent thermoset polymer with an index of refraction of at least 1.58 and a thin glass element with essentially constant thickness which sticks to the anterior surface of the lens made of thermoset polymer, without the use of an intermediate adhesive, wherein:

the thermoset polymer is a thermoset aromatic epoxy resin; and the thin glass element has an essentially constant thickness of 0.15–0.3 mm.

2. A composite lens according to claim 1, wherein the thin glass element is a photochromic glass element.

3. A composite lens according to claim 1, wherein the thermoset aromatic epoxy resin is produced by polymerization of diglycidyl ether bisphenol A, on one hand, and 4',4'-diaminodiphenylsulfone, xylylenediamine or phthalic anhydride, on the other hand.

4. A composite lens according to claim 2 wherein the thermoset aromatic epoxy resin is produced by polymerization of diglycidyl ether bisphenol A, on one hand, and 4,4'-diaminodiphenylsulfone, xylylenediamine or phthalic anhydride, on the other hand.

5. A composite lens according to claim 1, wherein the thin glass element has a thickness of 0.2 to 0.3 mm.

6. A composite lens according to claim 2 wherein the thin glass element has a thickness of 0.2 to 0.3 mm.

7. A composite lens according to claim 3 wherein that the thin glass element has a thickness of 0.2 to 0.3 mm.

8. A composite lens according to claim 1, wherein the thin glass element is treated with an adhesion promoter.

9. A composite lens according to claim 8 wherein the thin glass element is a photochromic glass element.

10. A composite lens according to claim 3 wherein the thin glass element is treated with an adhesion promoter.

11. A composite lens according to claim 5 wherein the thin glass element is treated with an adhesion promoter.

12. A composite lens according to claim 8, wherein the adhesion promoter is a silane.

13. A process for manufacturing a composite lens, consisting of a transparent thermoset polymer with an index of refraction of at least 1.58 and a thin glass element with essentially constant thickness which sticks to the anterior surface of the lens made of thermoset polymer without the use of an intermediate adhesive comprising pouring thermosetting aromatic epoxy resin composition (5), which, after hardening, forms a transparent aromatic epoxy resin with an index of refraction of at least 1.58, directly into the concave part of a thin preformed glass element (1) with an essentially constant thickness of 0.15–0.3 mm; of applying onto the mass of poured thermosetting composition, counterform (7) to shape the upper surface of said mass as desired; of subjecting the element (1)-resin composition (5)-counterform (7) assembly to a thermal treatment which brings about the hardening of the thermosetting composition; of removing the counterform; and then of trimming the edges of the lens.

14. A process according to claim 13, wherein counterform (7) has anti-sticking properties.

15. A process according to claim 13, wherein the glass element is treated with an adhesion promoter before the thermosetting composition is poured.

16. A process according to claim 13, wherein spacing wedges (6) are placed at the periphery of the concavity of glass element (1) before counterform (7) is positioned.

* * * * *